United States Patent [19]

Tsunekawa et al.

[11] Patent Number: 4,524,596
[45] Date of Patent: Jun. 25, 1985

[54] METHOD OF FORMING AND FEEDING TORSION SPRINGS

[75] Inventors: Yuzo Tsunekawa; Takashi Tomizawa, both of Odawara, Japan

[73] Assignee: Fuji Photo Film Co., Ltd., Japan

[21] Appl. No.: 543,000

[22] Filed: Oct. 18, 1983

[30] Foreign Application Priority Data

Oct. 22, 1982 [JP] Japan .................................. 57-185828

[51] Int. Cl.³ .................................................. B21F 3/04
[52] U.S. Cl. ........................................ 72/133; 29/33 F; 29/33 J; 29/792; 72/142
[58] Field of Search ................... 29/33 F, 33 J, 33 K, 29/33 P, 792; 72/131, 132, 133, 137, 138, 142, 135

[56] References Cited

U.S. PATENT DOCUMENTS 3,192,748 7/1965 Lange ..................................... 72/14
4,111,241 9/1978 Crown .............................. 72/137 X
4,362,038 12/1982 Katahira et al. ................ 72/137 X Primary Examiner—E. Michael Combs
Attorney, Agent, or Firm—Murray, Whisenhunt & Ferguson

[57] ABSTRACT

A torsion spring having a coiled portion and straight ends is formed on a spindle by a winding machine with the coiled portion being wound around the spindle. A transfer device for transferring the torsion spring to a spring feeding position in which the torsion spring is fed to a spring inserting device receives the torsion spring directly from the spindle and transfers it to the spring feeding position keeping the torsion spring in a predetermined orientation.

2 Claims, 6 Drawing Figures

METHOD OF FORMING AND FEEDING TORSION SPRINGS

BACKGROUND OF THE INVENTION

1. Field of the Invention

This invention relates to a method of feeding a torsion spring, and more particularly to a method of feeding the torsion spring in a predetermined orientation to a predetermined location in the system which uses the same.

2. Description of the Prior Art

There is in wide use a torsion spring formed of a coiled resilient wire having straight ends to urge various members by its resiliency in the torsional direction of the coiled portion.

When such a torsion spring is inserted into the system in which it is used at a predetermined location, conventionally the torsion spring has been fed to the spring inserting means by way of a bowl-feeder into which a plurality of torsion springs manufactured in advance in an independent step are introduced. The bowl-feeder regulates the orientation of the torsion springs and feeds them to the spring inserting means one by one. However, when a plurality of torsion springs are placed together, they are apt to become entangled. Further since high dimensional accuracy is not generally required for such springs, the torsion springs are apt to fluctuate in shape. Therefore, when the torsion spring is fed by way of the bowl-feeder, malfunction of feeder frequently occurs. For example, the torsion springs are sometimes be fed in the wrong orientation, or the feeder is jammed by entangled springs.

SUMMARY OF THE INVENTION

In view of the foregoing observations and description, the primary object of the present invention is to provide a method of feeding a torsion spring which is free from the malfunction inherent to the conventional systems.

The method of the present invention is characterized in that a torsion spring formed by a winding machine is directly delivered from the winding machine to a transfer means and transferred, while keeping a predetermined orientation, to the spring feeding position in which it is to be fed to a spring inserting means which inserts the torsion spring into the system which uses it.

In accordance with the present invention, the spring forming step and the spring feeding step are operatively connected with each other and the spring is transferred from the winding machine to the spring feeding position with the orientation of the spring being controlled during the transfer. Therefore, the very difficult step of separating tangled torsion springs and regulating the orientation of each torsion spring can be eliminated, whereby torsion springs can always be fed correctly.

DESCRIPTION OF THE PREFERRED EMBODIMENTS

Figure 1:
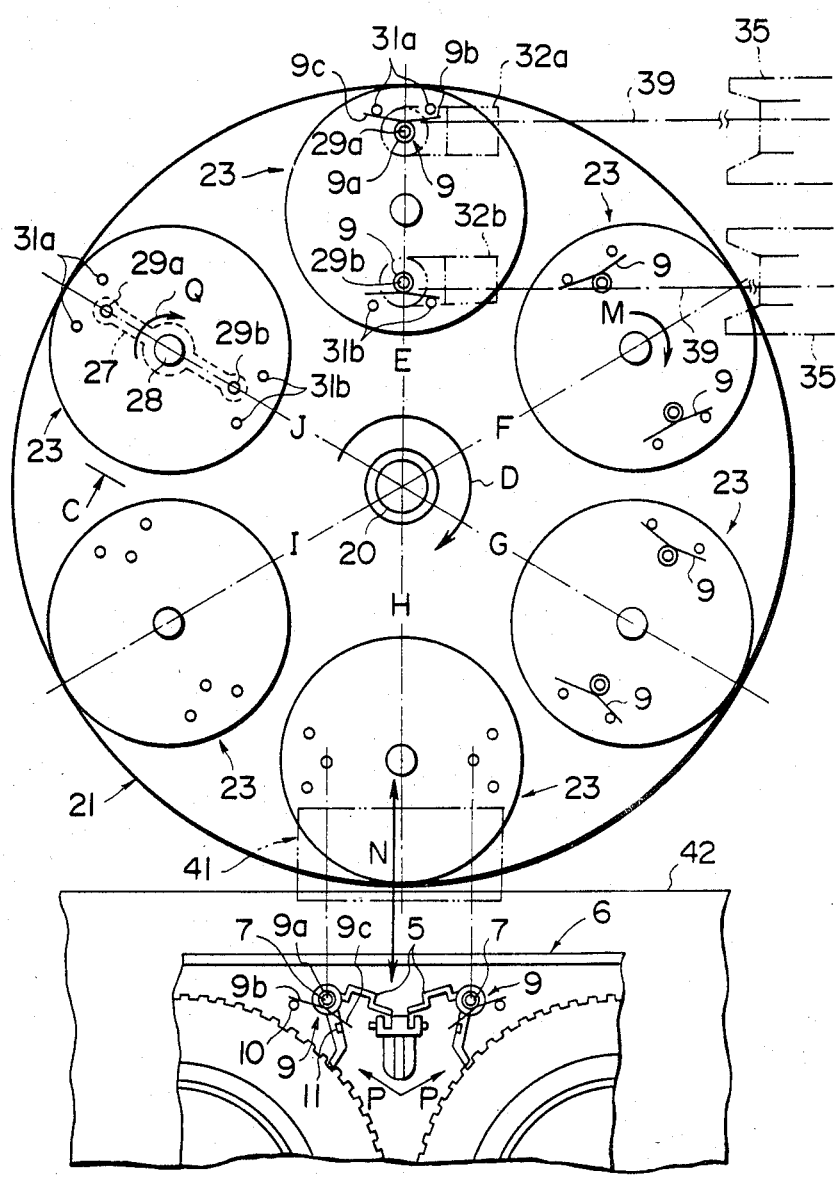
FIG. 1 is a schematic plan view of a system for carrying out the method of feeding a torsion spring in accordance with an embodiment of the present invention.

FIG. 1 is a schematic plan view of a system which carries out the method of the present invention. In FIG. 1, the system is used for feeding torsion springs to be incorporated in video tape cassettes.

Figure 2:
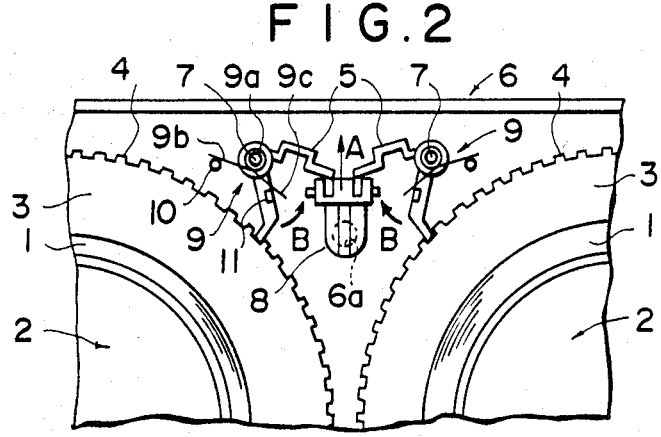
FIG. 2 is a fragmentary plan view of a video tape cassette in which the torsion spring is incorporated using the system of FIG. 1.

The torsion springs are used for urging locking members which prevent the reels in the cassette from rotating in the unwinding direction, that is the direction in which the respective reels rotate to unwind the video tape wound thereon. As shown in FIG. 2, a pair of reels 2 around which a video recording tape 1 is wound are provided with gear teeth 4 along the entire peripheral edge of their lower flange 3. A pair of locking members 5 which are adapted to be engaged with the gear teeth 4 on the respective reels 2 are pivotally supported on pivot pins 7. Each locking member 5 is normally urged by a torsion spring 9 in the direction opposite to the associated arrow B to engage with the gear teeth on the corresponding reel 2 to prevent rotation of the reel 2 in the unwinding direction. The torsion spring 9 is held on the pivot pin 7 with the coiled portion 9a receiving therein the pivot pin 7, one end 9b abutting against a stud 10 fixed to the cassette half 6 forming the cassette casing and the other end 9c abutting against a pin 11 fixed to the locking member 5. A releasing member 8 is mounted in the cassette half 6 for sliding movement in the direction of the arrow A. When the cassette is inserted into the system which uses the cassette, e.g., a video tape recorder, the releasing member 8 is moved in the direction of the arrow A pushed by a member provided in the system which acts on the releasing member 8 through an opening 6a formed in the cassette half 6, whereby the locking members 5 are swung, overcoming the force of the torsion springs 9, to be disengaged from the gear teeth 4 on the respective reels 2. The system shown in FIG. 1 is used for feeding the torsion springs 9 to a predetermined location in the cassette body and in a correct orientation for inserting them into the cassette.

Figure 3:
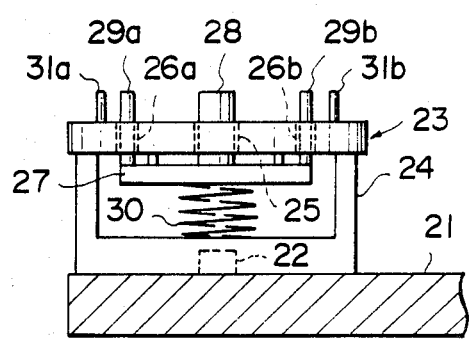
FIG. 3 is a side view of a part of the system of FIG. 1.

Referring to FIG. 1, a circular index table 21 is mounted on a rotary shaft 20 for rotation about the rotary shaft 20. The index table 21 supports thereon six sub-tables 23. The six sub-tables 23 are arranged on a circle about the rotary shaft 20 evenly spaced from each other by 60°. Each sub-table 23 is fixedly mounted on a support member 24 which is supported on the index table 21 for rotation about a rotary shaft 22 as shown in FIG. 3. The sub-table 23 is further provided with a central guide opening 25 and a pair of pin receiving holes 26a and 26b on opposite sides of the guide opening 25, the pin receiving holes 26a and 26b being circular in cross section. A connecting member 27 is supported on a coil spring 30 between the support member 24 and the sub-table 23. The connecting member 27 has an upwardly projecting guide pin 28 and a pair of spring support pins 29a and 29b which project upwardly on opposite sides of the guide pin 28 and are cylindrical in shape. The guide pin 28 and the spring support pins 29a and 29b are slidably inserted into the guide opening 25 and the pin receiving holes 26a and 26b of the sub-table 23, respectively, to project beyond the upper surface of the sub-table 23. A pair of spring retainer pins 31a project from the sub-table 23 on the outer side of the spring support pin 29a, and a pair of spring retainer pins 31b project from the sub-table 23 on the outer side of the spring support pin 29b.

The index table 21 is intermittently rotated by 60° in the direction of the arrow D by a driving system (not shown) to successively bring the six sub-tables 23 to six positions denoted by E, F, G, H, I and J in FIG. 1.

Above the position E are provided a pair of winding machines 32a and 32b which form the torsion springs 9 and deliver them to the sub-table 23 positioned in the position E. The torsion springs 9 delivered to the sub-table 23 are respectively held in place by the spring support pin 29a and the spring retainer pins 31a, and the spring support pin 29b and the spring retainer pins 31b.

Now referring to FIG. 4, the operation of the winding machines 32a and 32b will be described in detail. Since the winding machines 32a and 32b are identical to each other, only the winding machine 32a will be described. The winding machine 32a comprises a spindle 33, a cutter 34 and a wire feed roller 35. The spindle 33 has a base portion 33b having a large diameter and a thinner winding portion 33a extending from the base portion 33b. The winding portion 33a is axially aligned with the spring support pin 29a of the sub-table 23 in the position E with the free end face of the winding portion 33a being opposed and adjacent to the top face of the spring support pin 29a. An engaging projection 36 extends from the base portion 33b in parallel to the winding portion 33a slightly spaced therefrom. The cutter 34 comprises a fixed blade 37 and a movable blade 40. The fixed blade 37 is provided with a guide bore 38 extending therethrough in the horizontal direction. A resilient wire 39 wound around the wire feed roller 35 is passed through the guide bore 38.

Figure 4:
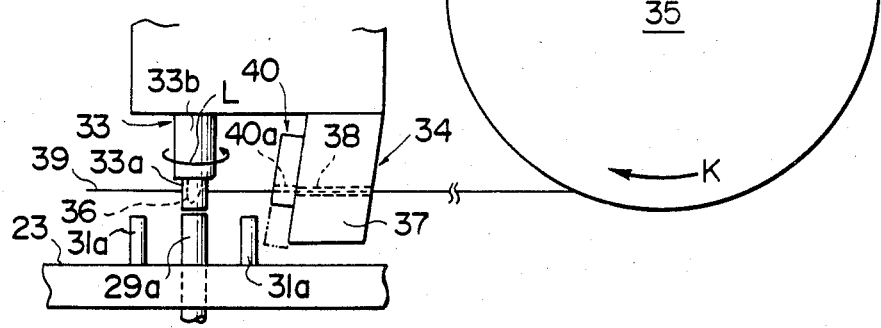
FIG. 4 is an enlarged side view of a part of the system of FIG. 1.

When forming the torsion spring 9, the wire 39 is fed leftwardly as seen in FIG. 4 by a wire feeding mechanism (not shown) with the wire feed roller 35 being rotated in the direction of the arrow K to project leftwardly from the guide bore 38 of the fixed blade 37. The wire 39 is passed between the winding portion 33a and the engaging projection 36 of the spindle 33 guided by the guide bore 38. The wire feeding mechanism and the wire feed roller 35 are stopped when the leading end of the wire 39 projects from the spindle 33 leftwardly by a predetermined length as shown in FIG. 4. Then the spindle 33 is rotated in the direction of the arrow L, i.e., the counterclockwise direction as seen from above in FIG. 4, and the wire 39 is wound around the winding portion 33a of the spindle 33 pushed by the engaging projection 36. The spindle 33 is stopped when the engaging projection 36 returns to the original position shown in FIG. 4 after the wire 39 is wound around the winding portion 33a a predetermined number of times, e.g., twice or three times. At this time the leading end of the wire 39 is directed in the direction in which it was directed at the beginning of winding.

After the spindle 33 is stopped, the movable blade 40 is slid downwardly along the fixed blade 37 to sever the torsion spring 9 thus formed, from the wire 39. Since the movable blade 40 is moved downwardly to the position shown by the chained line in FIG. 4, the torsion spring 9 is pushed downwardly to be removed from the winding portion 33a of the spindle 33 and is placed on the sub-table 23 with the coiled portion 9a receiving therein the spring support pin 29a and with the straight end portions 9b and 9c of the torsion spring 9 being positioned on the same side of the respective spring retainer pins 31a. That is, the clockwise rotation of the torsion spring 9 is limited by the abutment of one end portion 9c against the corresponding spring retainer pin 31a and the counterclockwise rotation of the same is limited by the abutment of the other end portion 9b against the other spring retainer pin 31a. Thus the torsion spring 9 is held on the sub-table 23 in a predetermined position with a limited rotation about the spring support pin 29a being permitted.(See FIG. 1) The movable blade 40 is provided with a guide groove 40a in the lower end surface thereof. When the torsion spring 9 is severed from the wire 39, the severed end of the spring 9 is passed through the guide groove 40a and the spring 9 is positioned in place on the sub-table 23 guided by the guide groove 40a.

The pair of torsion springs 9 thus formed by the winding machines 32a and 32b are thus transferred to the sub-table 23. The index table 21 is intermittently rotated in the clockwise direction to successively bring each sub-table 23 from the position E to the positions F to J in this order after the sub-table 23 receives the torsion springs 9. Each sub-table 23 is rotated about the rotary shaft 22 by 90° in the direction of the arrow M while being brought from the position E to the position F. In the position G, whether or not both the torsion springs 9 are held in proper orientation is checked by a detecting device (not shown) which may be of the photoelectrically detecting type, for example.

When it is determined that the torsion springs 9 on the sub-table 23 are held in the correct orientation, the torsion springs 9 are fed to a spring inserting device 41 positioned adjacent to the position H after the sub-table 23 is moved to the position H. On the other hand, when it is determined that the torsion springs 9 on the sub-table 23 are held in the wrong orientation, the springs 9 are not fed to the spring inserting device 41 and are rejected from the sub-table 23 in the position I as will be described in detail hereinafter. The spring inserting device 41 inserts the springs 9 fed from the sub-table 23 into the cassette half 6 which are intermittently fed by a suitable transfer means such as a belt conveyor and stopped by the position H. That is, the spring inserting device 41 is moved back and forth over the sub-table 23 and the cassette half 6 to receive the torsion springs 9 in a spring receiving position above the sub-table 23 in the position H and to insert the torsion springs 9 into the cassette half 6 in an insertion position above the cassette half 6.

Though well known in the art, the operation of the spring inserting device 41 will be briefly described hereinbelow referring to FIGS. 5 and 6.

Figure 5:
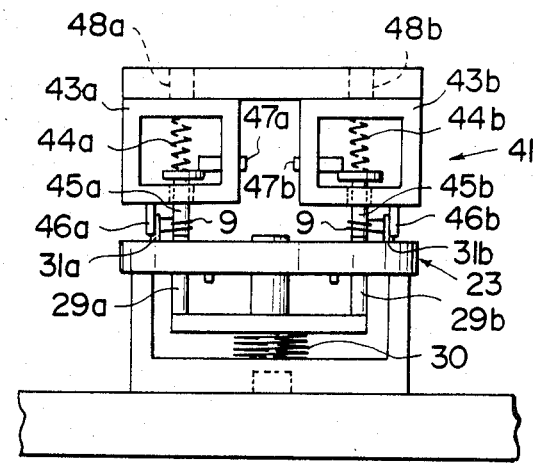
FIG. 5 is a side view of an example of a spring inserting device which can be associated with the system of FIG. 1.
Figure 6:
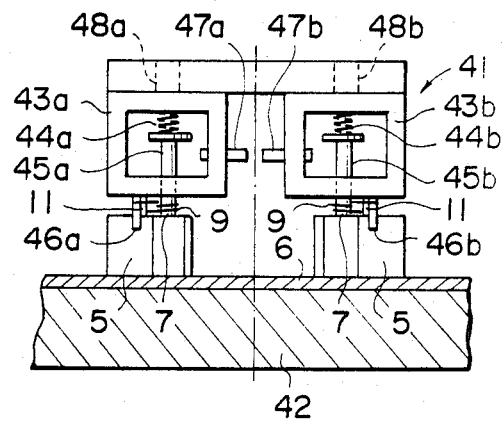
FIG. 6 is a partly developed side view of the spring inserting device of FIG. 5 seen in the direction of the arrows P in FIG. 1 but in an operational stage different from that of FIG. 5.

As shown in FIG. 5, the spring inserting device 41 includes a pair of tables 43a and 43b. The tables 43a and 43b respectively support spring receiving pins 45a and 45b which are slidable up and down with respect to the tables 43a and 43b and are adapted to be vertically aligned with the spring support pins 29a and 29b of the sub-table 23 positioned in the position H. The spring receiving pins 45a and 45b are urged downwardly by coil springs 44a and 44b respectively. A pair of spring retainer pins 46a and a pair of spring retainer pins 46b respectively project downwardly from the lower surfaces of the tables 43a and 43b. When the spring inserting device 41 is moved to the spring receiving position in which the spring receiving pins 45a and 45b are respectively aligned with the spring support pins 29a and 29b of the sub-table 23, the spring retainer pins 46a and 46b are positioned outwardly offset from the spring retainer pins 31a and 31b of the sub-table 23. The upward movement of the spring receiving pins 45a and 45b is limited by stoppers 47a and 47b.

In the spring receiving position, the spring inserting device 41 is moved downward, whereby the spring receiving pins 45a and 45b of the spring inserting device 41 respectively push down the spring support pins 29a and 29b of the sub-table 23 overcoming the force of the coil spring 30 as shown in FIG. 5. The spring inserting device 41 is moved downwardly until the spring receiving pins 45a and 45b are received in the coiled portions 9a of the torsion springs 9 in place of the spring support pins 29a and 29b of the sub-table 23. When the spring inserting device 41 is subsequently moved upwardly, the springs 9 are moved upwardly held by the spring receiving pins 45a and 45b with the end portions thereof resiliently abutting against the spring retainer pins 46a and 46b.

Then the spring inserting device 41 is moved to the inserting position in which the spring receiving pins 45a and 45b are respectively aligned with the pivot pins 7 on the cassette half 6. Subsequently the stoppers 47a and 47b are retracted to permit upward movement of the spring receiving pins 45a and 45b and the spring inserting device 41 is moved downward as shown in FIG. 6, whereby the spring receiving pins 45a and 45b are pushed by the pivot pins 7 into the tables 43a and 43b overcoming the force of the coil springs 44a and 44b. The torsion springs 9 are thus transferred to the pivot pins 7 with their end portions being positioned in a predetermined orientation with respect to the studs 10 and the pins 11 on the locking members 5.

When the spring inserting device 41 is moved to the inserting position, the tables 43a and 43b are rotated about rotary shafts 48a and 48b to bring the torsion springs 9 into the position in which they are to be inserted into the cassette half 6.

When it is determined that the torsion springs 9 are held in the wrong orientation or that at least one of the spring support pins 29a and 29b supports no torsion spring, the spring inserting device 41 is not actuated, and when the sub-table 23 is moved to the position I, the guide pin 28 of the sub-table 23 is pushed down to retract below the upper surface of the sub-table 23 by a member not shown, whereby the torsion spring 9 held in the wrong orientation or the same supported by one spring support pin 29a or 29b is released. Then the released torsion spring 9 or springs 9 are removed from the sub-table 23 by a blast of air, for example.

The sub-table 23 is rotated by 90° in the direction of the arrow Q in the position J (in this position the sub-table 23 supports no torsion spring 9) and is then moved to the position E to be fed with the torsion springs 9 again.

When the winding machines 32a and 32b are arranged to form the torsion springs 9 with the wire 39 being fed in the direction in parallel to the line connecting the center of the index table 21 and the center of the sub-table 23 in the position E of the index table 21, the sub-table 23 need not be rotated in the positions F and J and accordingly the sub-table 23 may be fixed to the index table 21.

Though in the above embodiment, the index table 21 is intermittently rotated by 60°, the index table 21 may be intermittently rotated by 90°. Further, in the above embodiment, when the sub-table 23 supports the torsion springs 9 in the wrong orientation or supports only one torsion spring 9, the torsion spring(s) 9 is(are) removed from the sub-table 23, but the system may be arranged to correct the failure, i.e., to correct the orientation of the spring 9 in case that the torsion spring 9 is held in the wrong orientation or to supply the missing torsion spring 9 in case that the sub-table 23 has not been fed with one of the torsion springs 9.

Though in the system shown in FIG. 1, the rotating index table 21 is used as the transfer means, other various transfer means may be used. For example, a conveyor device which can transfer the torsion spring 9 while keeping it in the predetermined orientation or a chute having a guide groove engaging with the torsion spring 9 may be used.

Further, the method of the present invention may be used for feeding one or more torsion springs to be inserted into any system.

We claim:

1. A method of feeding torsion springs to a system which uses the torsion springs, each torsion spring having a coiled portion and straight ends, the method comprising:

providing at least one winding means, having a spindle with an axis, for forming a torsion spring by winding a wire about said spindle;

providing a transfer means for transferring the torsion spring from said winding means to a spring feeding position in which the torsion spring is fed to a spring inserting means for inserting the torsion spring into a system which uses the torsion spring, while maintaining the torsion spring in a predetermined orientation during said transfer from the winding machine to the spring feeding position, said transfer means having at least one spring support pin having an axis and an associated pair of spring retainer pins;

forming a torsion spring by winding a wire about said spindle;

delivering the so-formed torsion spring to the transfer means by axially aligning said spindle and said spring support pin and moving the torsion spring in the axial direction from the spindle to the spring support pin so that the coiled portion of the torsion spring receives therein the spring support pin and the ends of the torsion spring are held in place by respective spring retainer pins.

2. The method as claimed in claim 1, wherein two winding means are provided for simultaneous formation of torsion springs, and said transfer means has two spring support pins, each with an associated pair of spring retainer pins; whereby a pair of torsion springs may be formed and then transferred to said spring feeding position simultaneously.

* * * * *